United States Patent
Brandwine

(10) Patent No.: US 9,544,137 B1
(45) Date of Patent: *Jan. 10, 2017

(54) ENCRYPTED BOOT VOLUME ACCESS IN RESOURCE-ON-DEMAND ENVIRONMENTS

(75) Inventor: Eric J. Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 539 days.

This patent is subject to a terminal disclaimer.

(21) Appl. No.: 12/981,007

(22) Filed: Dec. 29, 2010

(51) Int. Cl.
*H04L 9/08* (2006.01)

(52) U.S. Cl.
CPC ............... *H04L 9/083* (2013.01); *H04L 9/08* (2013.01)

(58) Field of Classification Search
CPC ................................ G06F 21/36; G06F 21/83
USPC .................. 713/150, 156, 172, 182, 185
See application file for complete search history.

(56) References Cited

U.S. PATENT DOCUMENTS

| | | | |
|---|---|---|---|
| 8,826,013 B1 | 9/2014 | Kodukula et al. | |
| 2005/0250538 A1* | 11/2005 | Narasimhan | G06Q 20/12 455/558 |
| 2007/0162766 A1* | 7/2007 | Watanabe | 713/193 |
| 2008/0019527 A1* | 1/2008 | Youn et al. | 380/278 |
| 2008/0235513 A1* | 9/2008 | Foster | G06F 21/33 713/185 |
| 2009/0300599 A1 | 12/2009 | Piotrowski | |
| 2009/0300607 A1* | 12/2009 | Ferris et al. | 718/1 |
| 2011/0191591 A1* | 8/2011 | Cheng et al. | 713/182 |
| 2011/0302400 A1* | 12/2011 | Maino et al. | 713/2 |
| 2011/0302415 A1 | 12/2011 | Ahmad et al. | |
| 2012/0096271 A1* | 4/2012 | Ramarathinam et al. | 713/172 |
| 2012/0331300 A1* | 12/2012 | Das | H04L 69/164 713/176 |

OTHER PUBLICATIONS

IEEE Dictonary; 7th Edition; 2000, p. 872.*
Virtual prepaid tokens for Wi-Fi hotspot access, Xia et al, 29th Annual IEEE International Conference, 2004.*
Moser, "Verify SSH Keys on EC2 Instances", Jul. 28, 2010, downloaded from <<http://ubuntu-smoser.blogspot.com/2010/07/verify-ssh-keys-on-ec2-instances.html>>on Dec. 21, 2010.
U.S. Appl. No. 61/350,809, filed Jun. 2, 2010, Ahmad et al. "Securing Customer Virtual Machines in a Multi-Tenant Cloud".
Amazon, "Amazon Elastic Compute Cloud User Guide", Amazon Web Services LLC, retrieved from <<http:aws.amazon.com/archives/Amazon-EC2/3965>>, Jun. 2010, 242 pages.
Office action for U.S. Appl. No. 12/980,959, mailed on Mar. 4, 2013, Brandwine, "Encrypted Boot Volume Access in Resource-On-Demand Environments", 30 pages.

(Continued)

*Primary Examiner* — Luu Pham
*Assistant Examiner* — Jahangir Kabir
(74) *Attorney, Agent, or Firm* — Lee & Hayes, PLLC

(57) ABSTRACT

In an resource-on-demand environment, dynamically created server instances are allowed to boot from encrypted boot volumes. Access keys to the boot volumes are provided from a key provider that authenticates new instances based on possession of a security token that has been previously shared between the key provider and the new instance through an out-of-band communication.

20 Claims, 7 Drawing Sheets

(56) References Cited

OTHER PUBLICATIONS

Final Office Action for U.S. Appl. No. 12/980,959, mailed on Oct. 21, 2013, Eric J. Brandwine, "Encrypted Boot Volume Access in Resource-On-Demand Environments", 33 pages.
Office action for U.S. Appl. No. 12/980,959, mailed on Sep. 5, 2014, Brandwine, "Encrypted Boot Volume Access in Resource-On-Demand Environments", 41 pages.
Final Office Action for U.S. Appl. No. 12/980,959, mailed on Mar. 12, 2015, Eric J. Brandwine, "Encrypted Boot Volume Access in Resource-On-Demand Environments", 42 pages.
Python, "Amazon EC2 Basics for Python Programmers", retrieved on Mar. 6, 2015 at <<http://web.archive.org/web/20090421150758/http://jimmyg.org/blog/2007/amazon-ec2-for-people-who-prefer-debian-and-python-over-fedora-and-java.html>>, Sep. 1, 2007, 16 pages.
Office action for U.S. Appl. No. 12/980,959 mailed on Sep. 30, 2015, Brandwine, "Encrypted Boot Volume Access in Resource-On-Demand Environments", 41 pages.
Matyas et al., "Controlled Access to System Managed Data Keys via a Security Token", IBM Technical Disclosure Bulletin, vol. 34, No. 11, Apr. 1992, 6 pages.

* cited by examiner

ENCRYPTED BOOT VOLUME ACCESS IN RESOURCE-ON-DEMAND ENVIRONMENTS

BACKGROUND

Internet or web-based services are increasingly based on multi-tenant cloud-based infrastructure services, also referred to as Infrastructure as a Service (IaaS) or resource-on-demand services. Resource-on-demand or IaaS services are typically provided by data centers that host large numbers of physical servers and associated resources. The physical servers are managed by virtualization software, which dynamically creates virtual servers for requesting customers. Using virtualization, a single hardware server can host multiple virtual servers. Individual virtual servers are referred to as server instances, and are created based on memory images that are specified or provided ahead of time by customers.

Server instances can be provisioned remotely and dynamically, resulting in easily scalable systems. Some cloud service providers provide automatic scaling, in which server instances are automatically created and destroyed in response to actual load or utilization.

Data privacy is a common concern when customers consider multi-tenant IaaS. To address this concern, some IaaS providers allow server instances to create and use encrypted storage volumes. Encrypted volumes can be created and accessed using various types of cryptographic keys. Customer applications can typically be relied upon to manage and safeguard such keys.

Increasingly, however, there is a demand for encrypted boot volumes. Specifically, customers want to create server instances that boot from encrypted storage volumes. This introduces challenges with respect to key management.

Typically, as resources are scaled by or on behalf of a customer, server instances are created based on a common code or memory image. Boot volume encryption/decryption keys can conceivably be embedded within such an image, and can be obfuscated to make them difficult to extract. Obfuscation, however, is typically not viewed as an adequate measure of protection. Therefore, a more secure means of managing security tokens for encrypted boot volumes is often desired.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes systems, devices, and techniques for using encrypted boot volumes in multi-tenant resource-on-demand or infrastructure as a service (IaaS) environments in which server instances are created programmatically for use by customers. Upon requesting and creating a new server instance, a security token is created and then shared, using an out-of-band communications channel, between the new instance and a key server or provider. This can be performed during an initial unencrypted pre-boot sequence, as the new instance begins its execution, prior to accessing the instance's encrypted boot volume. The new instance can then use the shared security token as a basis for authentication with the key server. Upon authenticating the new instance based on the security token, the key server can provide a volume access key: a cryptographic key allowing access to the encrypted boot volume. The instance's boot process can then continue as normal, from the encrypted boot volume.

Figure 1:
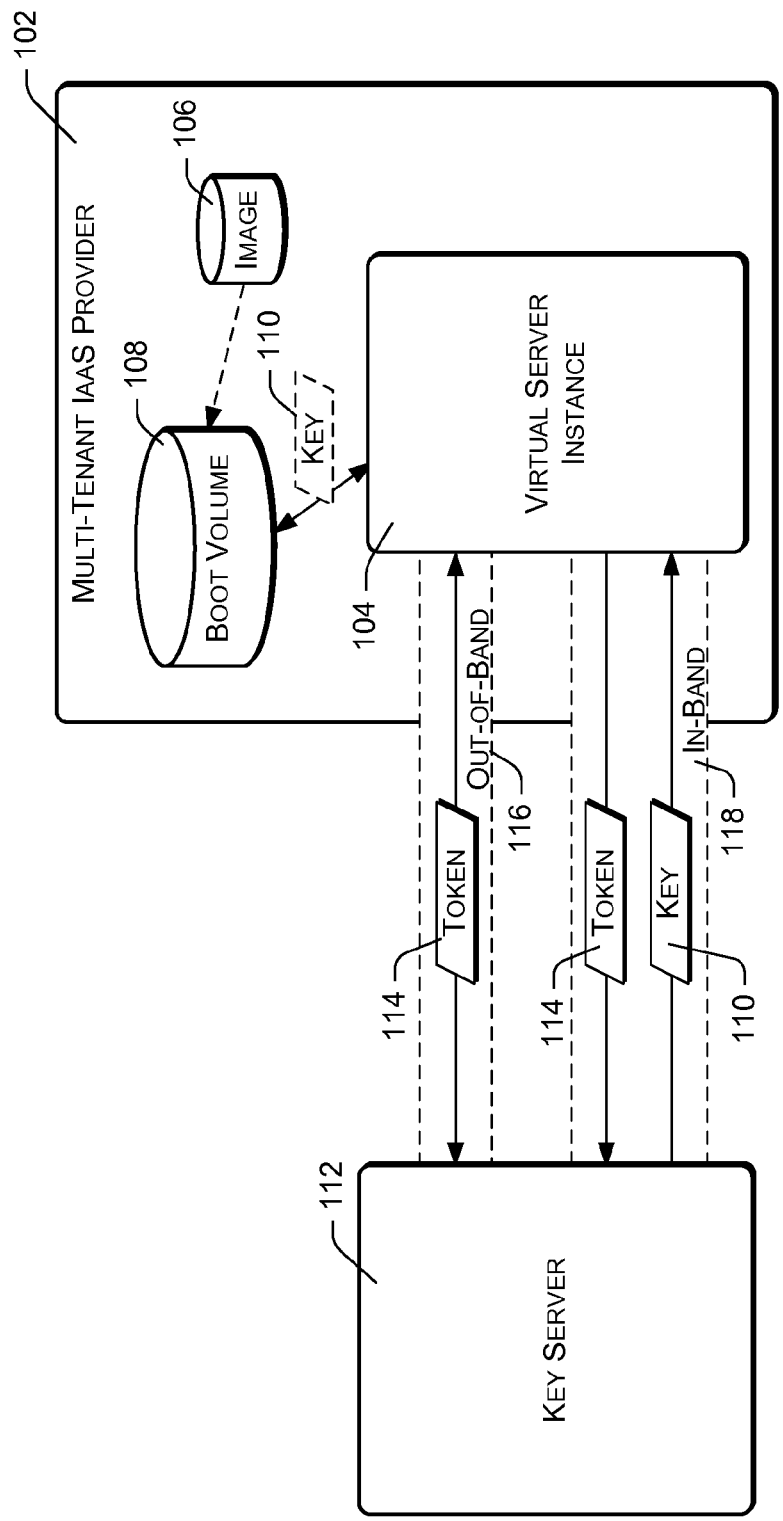
FIG. 1 is a block diagram showing a multi-tenant Infrastructure as a Service (IaaS) environment and an example of key management and transfer in such an environment.

FIG. 1 illustrates an environment in which these techniques may be carried out. In this example, a multi-tenant IaaS provider 102 creates and hosts a virtual server instance 104 and boot volume 108, based on an image or template 106 that has previously been supplied. The boot volume 108 is encrypted and can be accessed by the server instance 104 by the use of a cryptographic access key 110. The access key is unknown to the instance 104 upon initialization, but is subsequently obtained from a key server 112 as described below.

The new virtual server instance 104 is configured so that during an initial boot process or pre-boot process, before accessing the encrypted boot volume 108, the instance 104 requests the key 110 from the key server 112. However, the key server 112 authenticates requesting entities before returning keys to them. Specifically, the key server 112 ensures that any instance requesting a customer's access key 110 has actually been created, and therefore authorized, by the customer.

In the described embodiments, this is accomplished by sharing a security token 114 with the key server 112 and the newly created virtual server instance 104, using an out-of-band communications channel 116. The security token is then used as the basis for authenticating the new server instance, using normal in-band communications, illustrated in FIG. 1 as an in-band communications channel 118. Upon authentication based on the security token 114, the key server 112 provides the access key 110 to the virtual server instance 104. The virtual server instance 104 can then use the access key 110 for accessing the encrypted boot volume 108.

In one embodiment, referred to as infiltration or in-bound sharing, the customer specifies the security token 114 as user metadata when requesting instance creation from the provider 102. User metadata is accepted by the IaaS provider 102 and associated with the new instance. Upon initiation, during an unencrypted pre-boot process, the new instance 104 is configured to request the user metadata, which now includes the security token 114, via a secure and trusted communications channel. The provider 102 handles this request locally, and the communications channel is local to the physical machine that hosts the new server instance 104. This ensures that the request is handled securely and that metadata access is limited to the instance associated with the metadata, without requiring the instance to explicitly authenticate with the provider 102.

In another embodiment, referred to as exfiltration or out-bound sharing, the security token 114 is created or identified by the new virtual server instance 104, and communicated from the instance 104 to the key server 112 via some type of out-of-band communication mechanism such as a location that is accessible to the key provider only through an out-of-band communication. As an example, virtual server instances often provide console output as a form of out-of-band management communication, and the console output can be obtained by the customer using system management calls to the provider control plane. Virtual server instances can be configured to output the security token at the console output, and the customer key server 112 subsequently queries the console output to obtain the security token 114.

Figure 2:
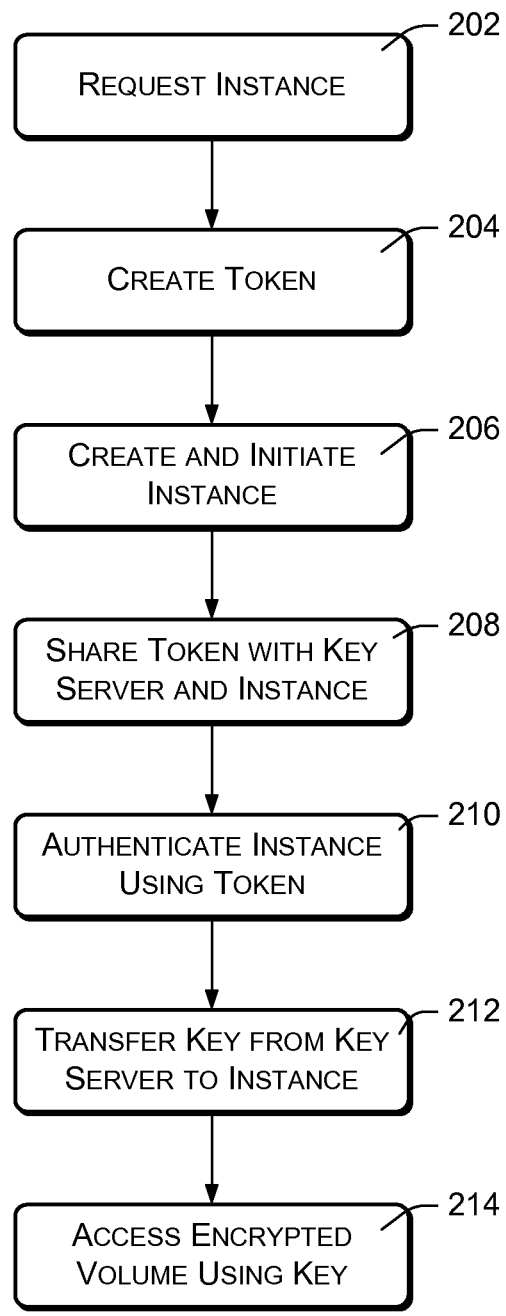
FIG. 2 is a flowchart illustrating an illustrative process of sharing an access key for use of an encrypted boot drive by a virtual server instance, in the environment shown by FIG. 1.

FIG. 2 illustrates this process in the form of a flowchart. At 202, a new instance is requested of an IaaS provider. This request may be submitted from a customer component, or as a result of automatic scaling requirements.

At 204, a security token is generated or created. The security token may be a randomly generated single-use code (often referred to as a "nonce"), or may be a cryptographic element such as an encryption key, a decryption key, an encryption/decryption key, a public portion of a private/public key pair, etc. It may be generated by any entity or component, such as by a key server, by the IaaS provider, by a management component of the IaaS provider, by a customer component, or by the newly-created instance itself.

At 206, the requested instance and its associated encrypted boot volume is created and initiated by the IaaS provider.

Note that the order of requesting the instance, creating the security token, and creating/initiating the new instance may be different than shown in FIG. 2, depending on implementation details and which of the various entities first generates or identifies the security token.

At 208, the security token is shared between the new instance and a key server. This may comprise providing the token from the key server to the instance, providing the token from the instance to the key server, or sharing to both the key server and the instance from some other element or entity. In some cases, metadata associated by the IaaS provider with the new instance may be used as the security token.

The sharing 208 is performed using an out-of-band communications channel. In the described embodiments, an out-of-band communications channel may be formed by a communications mechanism other than the exposed or public data interfaces of the newly-created virtual server instance itself. For example, such a channel might be formed in part by a connection from the customer, the key server, or the instance itself to the control plane of the provider 102. The customer typically communicates with the provider control plane using a secure and authenticated administrative connection, which is not directly visible to the server instance itself. The control plane is normally used to manage the services provided by the provider 102, but in accordance with certain techniques described herein can also be used to form an out-of-band communications channel for sharing the security token.

At 210, the new instance attempts to authenticate with the key server, using the security token. The security token may be simply submitted to the key server as a credential for authentication, or may be used as a basis for more complex cryptographic authentication procedures. For example, in some cases the security token may comprise a cryptographic element that is used in conjunction with signing or encrypting a communication from the new instance. The key server may attempt to verify the signature or to decrypt the communication based on the cryptographic element, with successful authentication being a requisite for authentication. In the case of asymmetric encryption, the security token may be a public key corresponding to a private key that has been used to sign or encrypt a key request from the new instance. As a further example, the security token may identify or be associated with a public cryptographic key, such as in the case of an SSH fingerprint.

At 212, in response to successful authentication of the new instance, an access key is transferred from the key server to the new instance. The access key is used at 214 to access the encrypted boot volume.

In-Bound Token Sharing

Figure 3:
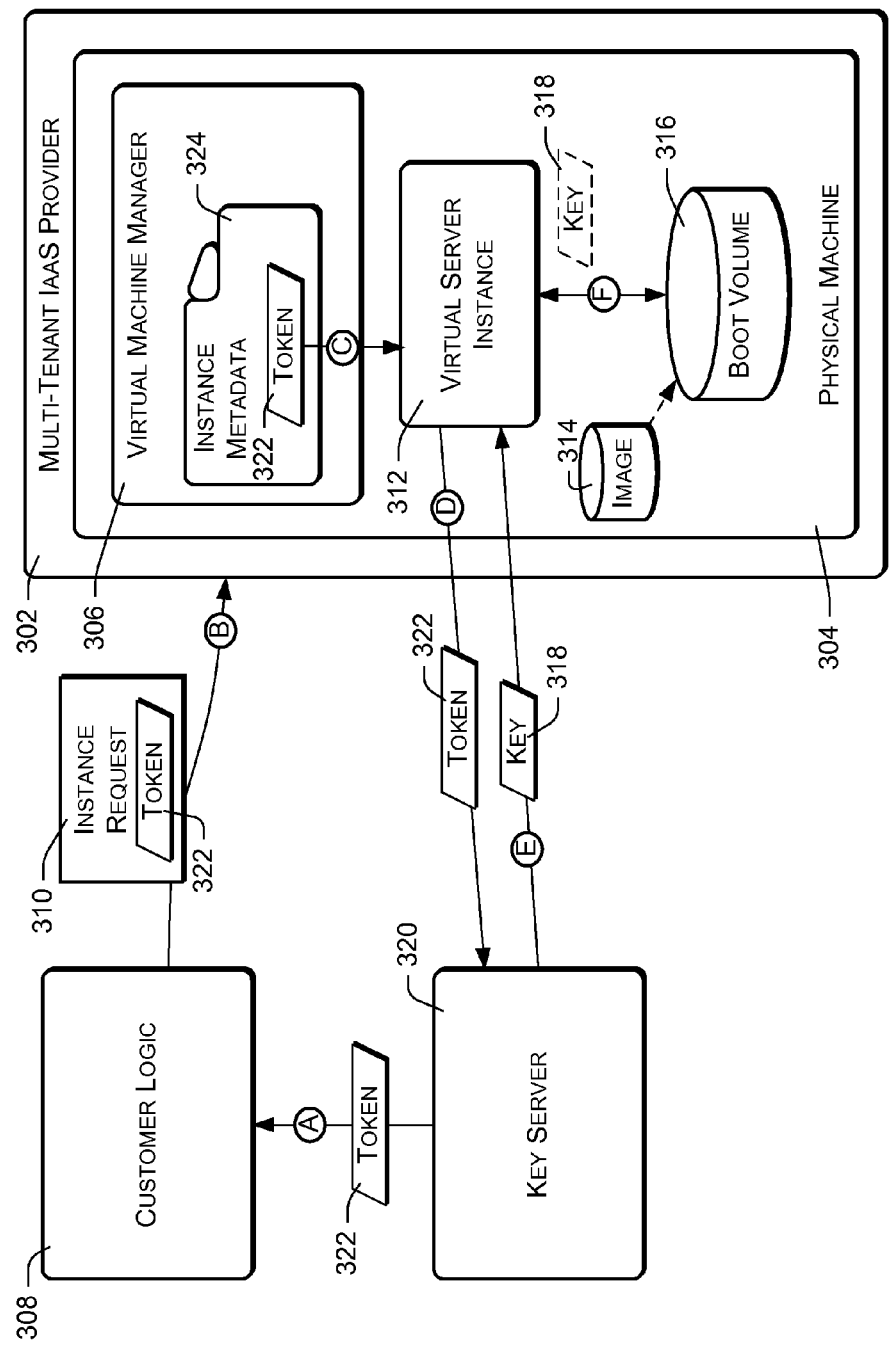
FIG. 3 is a block diagram showing a multi-tenant IaaS environment and another example of key management and transfer.

FIG. 3 illustrates an in-bound sharing embodiment in more detail. A multi-tenant IaaS provider 302 maintains a plurality of physical servers or machines 304 (only one of which is illustrated in FIG. 3). Each physical machine 304 runs under the supervision of a virtual machine manager 306, which supervises virtual server instances executing on and hosted by the physical machine 304. In the illustrated embodiment, the virtual machine manager 306 is local to the physical machine 304, although this may not always be the case.

A customer program or logic module 308 interacts with the control plane or administrative layer of the provider 302 to manage creation and elimination of virtual server instances. From time to time, the customer logic 308 submits an instance request 310 to the provider 302. In response to the instance request 310, the virtual machine manager 306 creates a virtual server instance 312 and an associated encrypted boot storage volume 316, based on an instance image or template 314 that has previously been supplied by the customer.

An access or decryption key 318 can be used to access the boot volume. The key may comprise a code, data object, or other form of data that can be used, directly or indirectly, to enable access to the boot volume 316. For security, the access key 318 is not stored in the image 314 and cannot be calculated or derived from information initially known by the virtual server instance 312.

In accordance with one embodiment, the access key 318 can be obtained from a key provider or server 320. The key server 320 may be created and maintained by the customer or by any other entity, and may be implemented within or outside of the Iaas provider 302. In some embodiments, the functionality described with reference to both the customer logic 308 and the key server 320 may be implemented in a single component or entity.

The key server 320 is configured so that it reveals keys only to authorized requestors. In order to ensure that a requestor is authorized, the requestor is authenticated based on its possession of a security token 322 that has previously been shared between the key server 320 and the customer logic 308. Initially, however, the instance 312 does not have the security token 322, and is not able to calculate or derive it from any data initially in its possession.

For discussion purposes, lines are shown in FIG. 3 to illustrate transactions and data flows that are involved in a process of authenticating the instance 312, thereby enabling it to receive the access key 318. Each line is labeled with an alphabetic character for reference, and corresponds to one or more actions that will be described below. The illustrated and described processes assume that the boot volume 316 can be accessed by using the access key 318, and that this key is stored by the key server 320. Existing security mechanisms are used for authentication between the customer logic 308 and the key server 320.

Referring now to the line labeled "A", the customer logic 308 obtains the security token 322 from the key server. The security token 322 may be a single-use number or code ("nonce") that is generated randomly by the key server 320 in response to a request by the customer logic 308. Note that the customer logic 308 may instead generate the security token 322, and provide it to the key server 320.

At "B", the customer logic submits the instance request 310 to the provider 302. This can be performed using public APIs (application program interfaces) associated with the control plane of the provider 302, using communication formats and protocols that are compatible with the particular provider being used. Authentication measures are typically employed when making these API calls to prevent unauthorized entities from tampering with a customer's configuration.

Certain IaaS providers allow a requesting customer to include user-specific metadata in instance requests or in conjunction with instance requests. This metadata, referred to as user metadata, is stored along with other metadata regarding a new instance, and is subsequently made available to the customer and to the instance itself through secure and trusted communications channels. The metadata, referenced by numeral 324 in FIG. 3, is controlled or stored locally, on the same physical machine as the new server instance 312. Access by the instance 312 to the metadata 324 is protected by the virtual machine manager 306 or by some associated component that is running at a privilege level above that of the server instance 312.

An instance such as server instance 312 can obtain its associated metadata 324 by means of a trusted communications channel. In the described embodiment, the trusted channel comprises a local, virtual network within the physical machine 304, which is implemented and controlled by the virtualization software or virtual machine manager 306 associated with the physical machine 304. The server instance 312 can thus make local network calls to obtain its associated metadata 324. These calls are directed to a virtual network port that is within the physical machine 304, and are received and handled by the virtual machine manager or some similar, privileged supervisory component executing on the physical machine 304. Because of this, requesting components such as the server instance 312 are inherently authenticated, and the metadata 324 can be obtained only by the server instance to which it pertains. Furthermore, these network calls are not visible to instances external to the physical machine 304.

In accordance with the embodiment of FIG. 3, the security token 322 is included or submitted contemporaneously with the instance request 310, to be included in the metadata 324 associated with the requested instance 312. Upon receiving the request 310, the provider 302 adds the security token to the metadata 324, and makes it available upon request to the newly created server instance 312.

At "C", during a pre-boot sequence of the newly created instance 312, the instance 312 requests instance metadata by making a call to a provider metadata service at a predefined local network port as described above, and thus obtains the token 322.

At "D", the server instance 312 submits a request to the key server 320, using the security token 322 for authentication. Upon such authentication, the key server 320 at "E" returns the key 318 to the server instance 312. At "F", the server instance uses the key 318 to access the boot volume 316, and continues its boot process.

In some implementations, additional checks can be performed to ensure that the requesting instance 312 is valid. For example, the key server 320 or the customer logic 308 can record the network address of the requesting instance and confirm with the provider 302 that the network address corresponds to an instance that has been created or authorized by the customer. Such confirmation can be performed out of band, by communicating with the control plane of the provider 302 using authenticated and secured communications. Alternatively, the requesting instance may include in its key request some type of descriptor assigned to the instance by the provider 302 and which is otherwise known only by the provider 302. An instance ID is an example of such a descriptor. Upon receipt of a key request that specifies an instance ID, the key server 320 or customer logic 308 may query the provider 302 out of band to verify that there indeed exists a customer instance with that instance ID.

Figure 4:
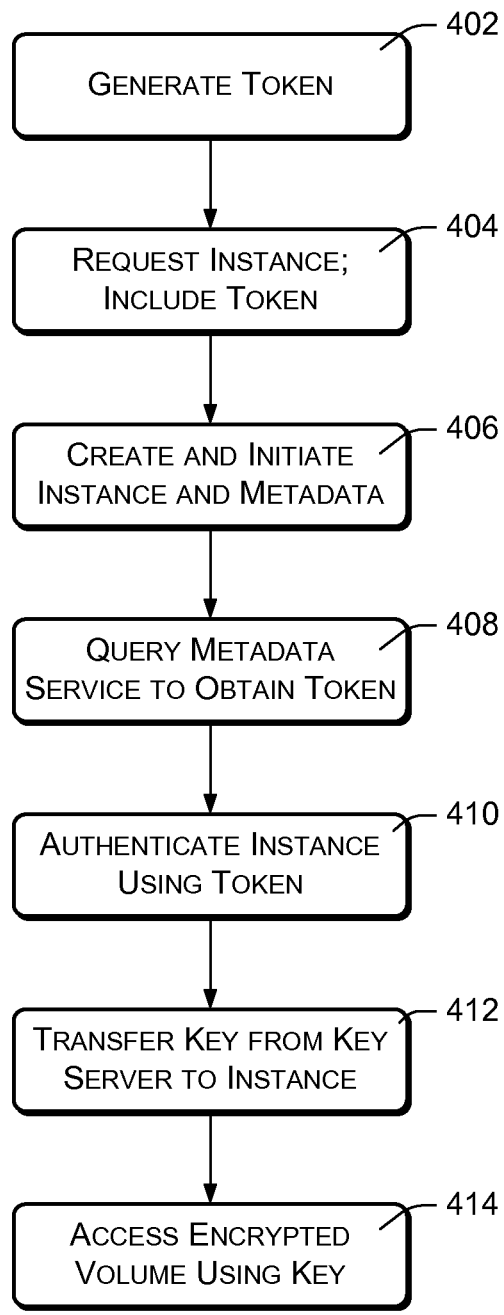
FIG. 4 is a flowchart illustrating another illustrative process of sharing an access key for use of an encrypted boot drive by a virtual server instance, in the environment shown by FIG. 3.

FIG. 4 illustrates this process in the form of a flowchart. At 402, a security token is generated. The security token can be generated in this embodiment by any component or entity other than the instance that is being newly created. For example, the security token can be generated by customer logic or by a key server. In the described embodiment, the security token is either generated by the key server or generated by some other component and shared with the key server.

At 404, an instance is requested. The instance requested is accompanied by the security token. In the described embodiment, the security token is specified as user metadata, to be associated with the metadata of the requested instance.

At 406, a new instance is created in response to the instance request of 404. The security token is stored along with any other metadata associated with the new instance.

At 408, the newly created instance queries a metadata service to obtain the security token. Such a metadata service may be provided or exposed by the IaaS provider. As described above, it is typically local to the machine hosting the new instance, and the new instance can be effectively authenticated by the metadata service based on low-level machine parameters.

At 410, the key server attempts to authenticate the new instance based at least in part on the security token. This may involve various cryptographic techniques, depending on implementation. Thus, it may involve signing or encrypting a key request, wherein the signature is to be verified or the request decrypted in conjunction with the security token. As mentioned above, authentication may also involve further communications with the provider, to verify ancillary information presented in or associated with the key request. For example, the key server may attempt to verify with the provider, using out-of-band communications, that the network address or instance ID of the requesting instance is indeed associated with a customer-authorized instance.

Upon successful authentication, at 412, the key server provides an access key to the new instance. At 414, the new instance uses the security key to access an encrypted boot volume, and then continues a boot process from the encrypted boot volume.

Out-Bound Token Sharing

Figure 5:
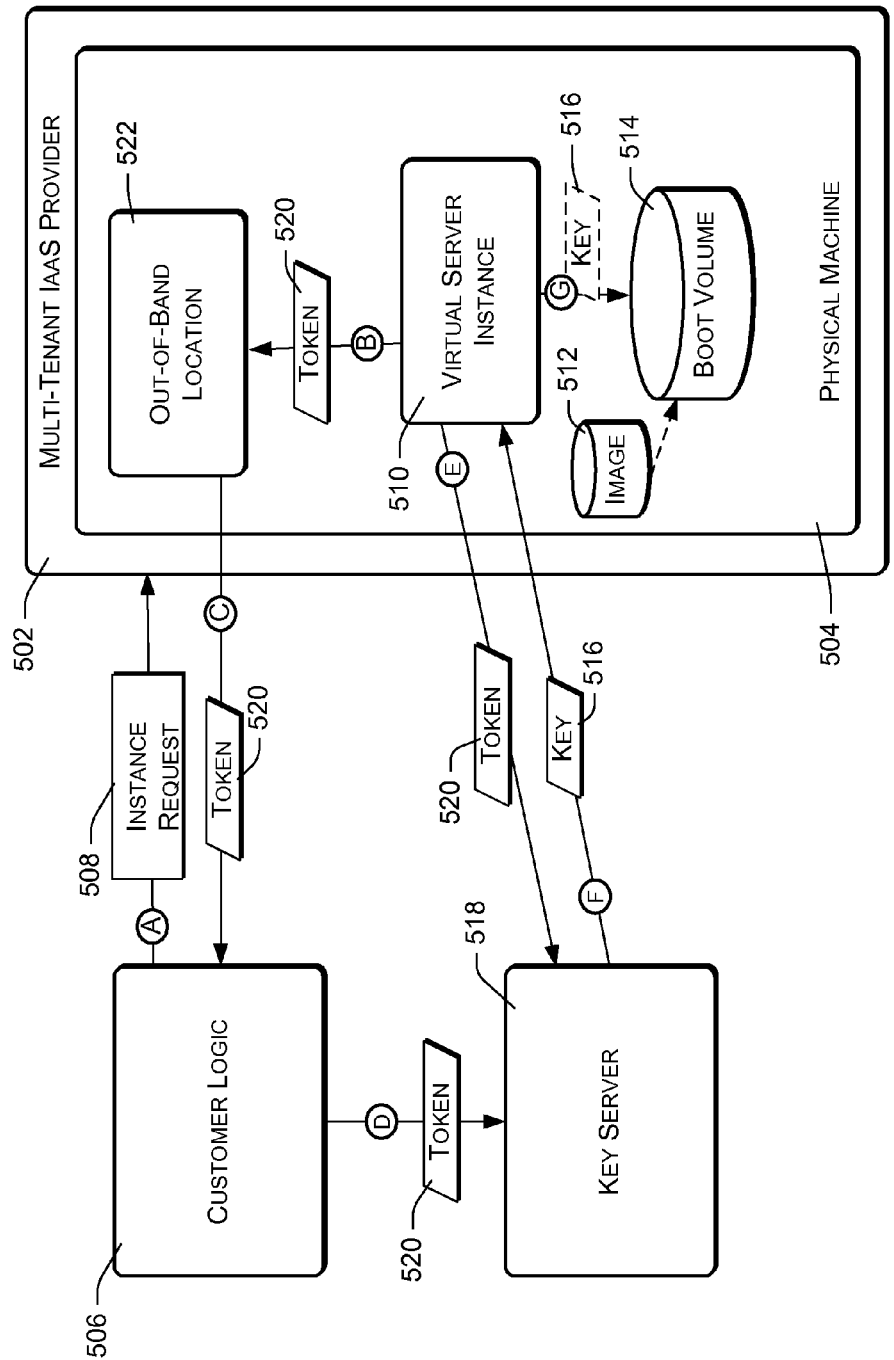
FIG. 5 is a block diagram showing a multi-tenant IaaS environment and another example of key management and transfer within such an environment.

FIG. 5 shows an alternative embodiment, in which the security token is created or identified by the new virtual instance, and communicated to the key server via console output. Virtual server instances usually provide such console output as a form of out-of-band management communication, and the console output can be obtained by the customer using system management calls to the IaaS management system. In this embodiment, virtual server instances are configured to identify or generate a security token, and to output it at the console output. After instance creation, the customer queries the console output to obtain the security token, and then shares it with the key server. Subsequent authentication of the new instance is then based on the shared knowledge of the security token.

More specifically, the example of FIG. 5 includes a multi-tenant IaaS provider 502 that maintains a plurality of physical servers or machines 504 (only one of which is illustrated in FIG. 5). A customer program or logic module 506 interacts with the provider 502 to manage creation and elimination of virtual server instances. In particular, the customer logic 506 from time to time submits an instance request 508 to the provider 502. In response to the instance request 508, the provider 502 creates a virtual server instance 510 and encrypted boot storage volume 514, based on an instance image 512 that has previously been supplied by the customer.

The boot volume 514 is encrypted, and an access key 516 can be used to access the boot volume. As in the previous implementation, the access key 516 is not stored in the image 512 and cannot be calculated or derived from information initially known by the virtual server instance 510.

In accordance with this embodiment, the access key 516 can be obtained from a key server 518. The key server 518 may be created and maintained by the customer or by any other entity, and may be implemented within or outside of the provider 502.

The key server 518 is configured so that it reveals keys only to authorized requestors. In order to ensure that a requestor is authorized, the requestor is authenticated based on its possession of a security token 520 that has previously been shared with the key server 518. In this embodiment, the virtual server instance 510 is configured to identify or generate the security token 520. The security token 520 may comprise a randomly-generated, single-use code or nonce. Alternatively, the security token may comprise the public part of a private/public key pair that is obtained or generated by the virtual server instance 510. The security token 520 might alternatively comprise other types of cryptographic codes, including encryption and/or decryption codes, or might comprise certain types of metadata associated with the instance 510. For example, the security token might comprise the network address of the instance 510, or a unique instance identifier associated by the provider 502 with the instance 510.

Referring now to the line labeled "A", the customer logic 506 submits the instance request 508 to the provider 502, and the provider responds by creating and initiating the virtual server instance 510. At "B", the new instance 510 outputs the security token 520 to an out-of-band destination or location that is accessible to the control plane of the provider 502, or that is otherwise accessible to the customer or key provider through out-of-band communications. For example, the instance 510 may output the security token 520 to its console output stream, which is designated in FIG. 3 by reference numeral 522. Other examples of out-of-band locations may include virtual ports, metadata, memory locations, and so forth, which may be accessible by way of authenticated out-of-band communications via the provider 502 and/or its control plane.

At "C", the customer logic 506 makes a supervisory, out-of-band call to the provider 502 to obtain token 520. More specifically, in the illustrated embodiment the customer logic 506 obtains the console output 522 of the instance 510, and extracts the token 520 from the console output. At "D", the customer logic shares or provides the token 520 to the key server 518.

At "E", the virtual server instance requests the key from the key server 518, subject to authentication based at least in part on the security token 520. The key server 518 attempts to authenticate the instance 510 based on the token 520. In some cases, the instance 510 may simply submit the security token, and the key server 518 may simply verify that it matches the one shared by the customer logic 506. In other cases more complex cryptographic procedures may be used, such as by signing the request or encrypting it in a way that depends on the security token. For example, the security token may be the public part of a private/public key pair, and the instance may sign its key request with corresponding private part of the key pair. This allows the key server to verify the signature using the public part of the key pair.

Authentication may also involve checking the instance ID or network address of the requesting instance 510, as described above with reference to FIGS. 3 and 4, to ensure that the requesting instance is indeed an instance known to the customer.

Upon successful authentication, the key server 518 at "F" returns the key 516 to the requesting instance 510, which can then use the key 516 to access the boot volume 514 at "G", and to complete its boot process.

Figure 6:
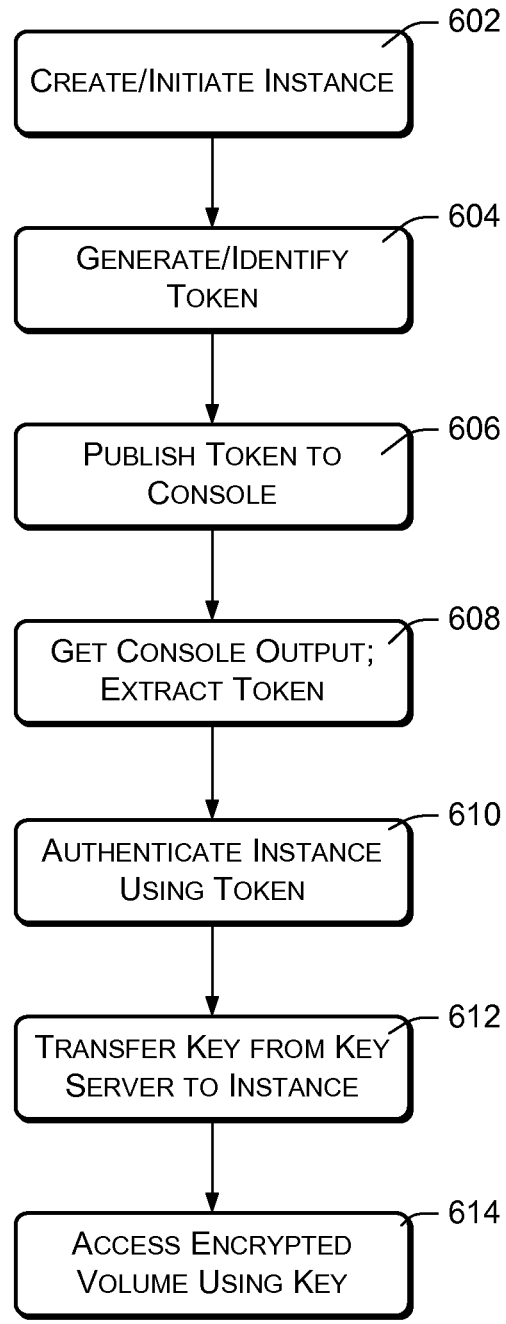
FIG. 6 is a flowchart illustrating yet another illustrative process of providing an access key for use of an encrypted boot drive by a virtual server instance, in the environment shown by FIG. 5.

FIG. 6 illustrates this process in the form of a flowchart. At 602, a virtual server instance is created and initiated in response to a request. At 604, a security token is identified or generated. The security token can be created or generated by the instance that has been newly created. It can be a randomly generated code, or a more complex cryptographic element such as part of a private/public key pair or other encryption/decryption key. The security token can also comprise some type of data that is generated by the IaaS and associated with the instance, such as an instance ID, network address, etc.

At 606, the instance publishes the security token to its console output. At 612, a key server or other component authorized by the customer communicates with the IaaS provider using a secure API call to get the console output, and extracts the security token from the console output.

At 610, the key server attempts to authenticate the new instance based at least in part on the security token. This may involve various cryptographic techniques, depending on implementation. Thus, it may involve signing or encrypting a key request, wherein the signature is to be verified or the request decrypted in conjunction with the security token. The authentication may also involve verifying the network address, instance ID, or some other instance-specific data with the provider, again using out-of-band communications.

Upon successful authentication, at 612, the key server provides an access key to the new instance. At 614, the new instance uses the security key to access an encrypted boot volume, and then continues a boot process from the encrypted boot volume.

Example Server

Figure 7:
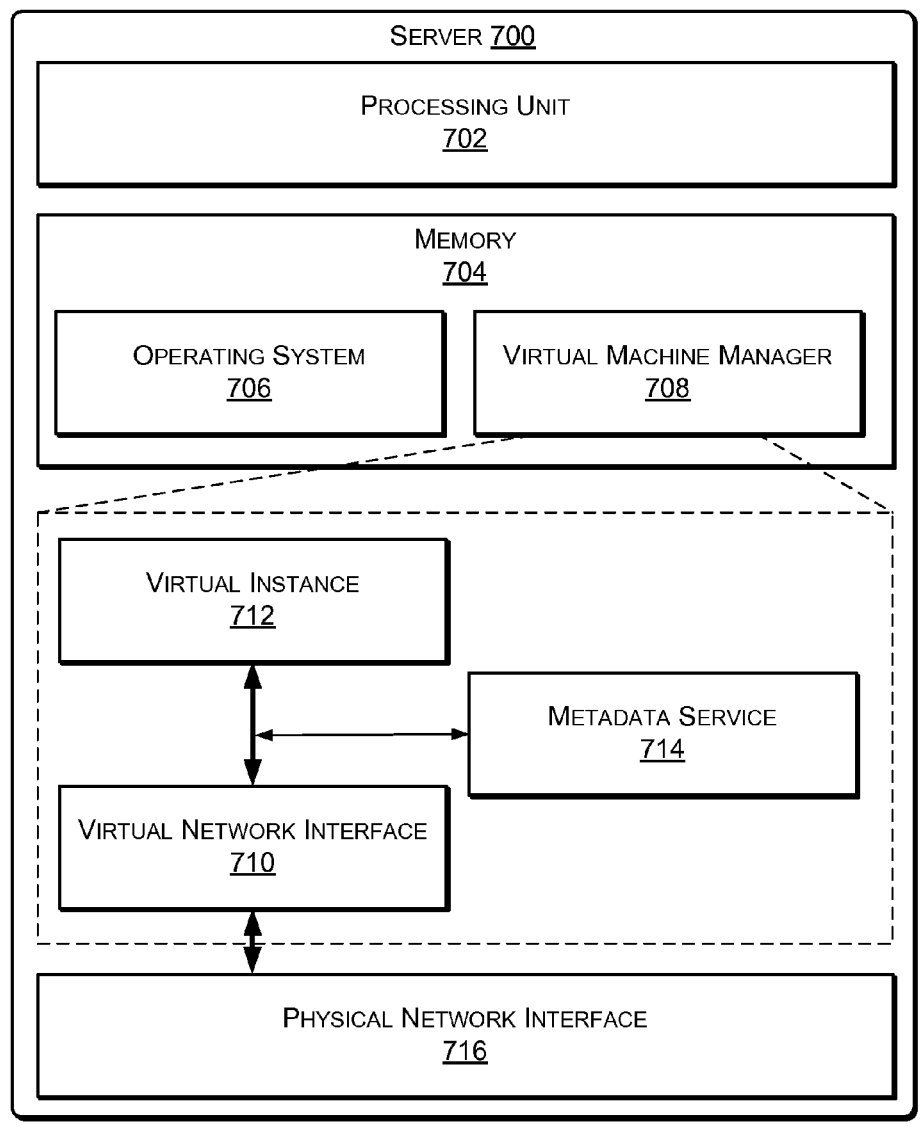
FIG. 7 is a block diagram illustrating relevant elements of a physical server that may be used in conjunction with the techniques described herein.

FIG. 7 illustrates relevant components of a physical server 700 that may form part of the environment described above. An IaaS provider may provide one or more of such servers. In a very basic configuration, an example server 700 may comprise a processing unit 702 composed of one or more processors, and memory 704. Depending on the configuration of the server 700, the memory 704 may be a type of computer storage media and may include volatile and non-volatile memory. Thus, the memory 804 may include, but is not limited to, RAM, ROM, EEPROM, flash memory, or other memory technology. The memory 704 may also include remote storage volumes.

The memory 704 may be used to store any number of functional components that are executable by the processing unit 702. In many embodiments, these functional components comprise instructions or programs that are executable by the processing unit 702, and that when executed implement operational logic for performing the actions that are described above as being performed within or by the IaaS. In addition, the memory 704 may store various types of data that are referenced by executable programs.

Functional components stored in the memory 704 may include an operating system 706 and a virtual machine manager 708 that provides and manages virtual instances within the server 700. Relevant logical functionality provided by the virtual machine manager 708 is shown within a dashed box within the server 700. Such logical functionality includes a virtual network interface 710 and one or more virtual instances 712 (only one of which is shown). The virtual machine manager 708 may also expose a metadata service 714, which may be configured as described above to store instance metadata and to make such metadata available to instances 712.

Generally, virtual instances within a single server 700 communicate over a local, virtual network, which is internal to server 700 and managed by the virtual machine manager 708. The metadata service 714 communicates with the virtual instances 712 using this internal, virtual network. The virtual machine manager 708, by virtue of its supervisory role, can ensure that metadata is obtained only by instances to which the metadata pertains.

The server 700 also has a physical network interface 716, for network communications outside of the physical server itself.

CONCLUSION

Note that the various techniques described above are assumed in the given examples to be implemented in the general context of computer-executable instructions or software, such as program modules, executed by one or more computers or other devices. Generally, program modules include routines, programs, objects, components, data structures, etc. for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

The invention claimed is:

1. A resource providing device, comprising:
a storage device;
one or more processor devices, coupled to the storage device, configured to perform actions comprising:
receiving a request from a customer via a customer device to create (i) a virtual server instance and (ii) a boot volume that is encrypted; and
initiating the virtual server instance based at least in part on a pre-defined instance image; and
a server configured to execute the virtual server instance configured to perform actions comprising:
identifying a security token;
associating the security token with metadata received with the request from the customer;
publishing the security token to an out-of-band location using an out-of-band communications channel, wherein the out-of-band location is accessible to the customer device to enable the customer device to access the security token from the out-of-band location and transmit the security token to a key server;
transmitting a request for authentication to the key server device using an in-band communications channel, wherein the request for authentication includes at least one of (i) the security token or (ii) information derived based on the security token, wherein the key server device authenticates the virtual server instance based at least in part on (i) receiving the request for authentication and (ii) receiving the security token that was published by the virtual server instance to the out-of-band location, and wherein the in-band communications channel is different from the out-of-band communications channel;
receiving from the key server device an access key, in response to the key server device authenticating the virtual server instance, wherein the security token and the access key are different;
decrypting the encrypted boot volume using the access key; and
booting from the encrypted boot volume.

2. The resource providing device of claim 1, wherein the out-of-band location comprises console output of the virtual server instance.

3. The resource providing device of claim 1, wherein the security token comprises a network address associated with the virtual server instance.

4. The resource providing device of claim 1, wherein the security token comprises a public cryptographic key corresponding to a private cryptographic key generated by the virtual server instance.

5. The resource providing device of claim 1, wherein the security token identifies a public cryptographic key corresponding to a private cryptographic key generated by the virtual server instance.

6. The resource providing device of claim 1, wherein the virtual server instance is further configured to publish the security token and transmit the request for authentication during at least one of an initial unencrypted boot process or an unencrypted pre-boot process.

7. A method for executing booting process of a server instance on a resource providing device, comprising:
   receiving, by one or more processors, a request via a customer device to create (i) a server instance and (ii) a boot volume that is encrypted;
   identifying, by the one or more processors, a security token;
   associating the security token with metadata received with the request from the customer device, the security token being associated with an access key;
   publishing, by the one or more processors, the security token to an out-of-band location using an out-of-band communications channel, wherein the out-of-band location is accessible to the customer device to enable the customer device to access the security token from the out-of-band location and transit the security token to a key server;
   transmitting, by the one or more processors, a request for authentication to the key server using an in-band communications channel that is different from the out-of-band communications channel, wherein the request for authentication includes at least one of (i) the security token or (ii) information derived based on the security token, wherein the key server authenticates the server instance based at least in part on (i) receiving the request for authentication and (ii) receiving the security token that was published to the out-of-band location;
   upon successful authentication at the key server, receiving, by the one or more processors, the access key from the key server, wherein the security token and the access key are different;
   decrypting the encrypted boot volume using the access key; and
   booting from the boot volume that is decrypted.

8. The method of claim 7, wherein the out-of-band location comprises console output associated with the server instance.

9. The method of claim 7, wherein the security token is obtained from the out-of-band location and transferred to the key server prior to attempting to authenticate.

10. The method of claim 7 wherein the security token comprises an instance identifier (ID) associated with the server instance.

11. The method of claim 7, wherein the security token comprises a network address associated with the server instance.

12. The method of claim 7, wherein the security token comprises a public cryptographic key corresponding to a private cryptographic key generated by the server instance.

13. The method of claim 7, wherein the security token identifies a public cryptographic key corresponding to a private cryptographic key generated by the server instance.

14. A method for executing booting process of a server instance, the method comprising:
   transmitting, by a customer device, a request for creation of the server instance that is to boot from a boot volume, wherein the request for creation of the server instance is transmitted along with metadata associated with the server instance;
   specifying, by the customer device, a pre-defined instance image from which to create the server instance;
   obtaining, by the customer device, a security token from an out-of-band location, wherein the security token is published in the out-of-band location by the server instance using an out-of-band communications channel, wherein the security token is associated with the metadata;
   transmitting, by the customer device, the security token to a key server; and
   configuring, by the customer device, the server instance to perform actions comprising:
   transmitting a request to the key server for an access key using an in-band communications channel, wherein the in-band communications channel is different from the out-of-band communications channel, wherein the request to the key server includes at least one of (i) the security token or (ii) information derived based on the security token, and wherein the key server authenticates the server instance based at least in part on (i) receiving the request for the access key and (ii) receiving the security token that was stored in the out-of-band location by the server instance;
   based on the key server authenticating the server instance, receiving the access key from the key server, wherein the security token and the access key are different;
   decrypting the encrypted boot volume based at least on the access key; and
   executing a booting process of the service instance from the encrypted boot volume that has been decrypted.

15. The method of claim 14, wherein the request to obtain the access key is associated with an instance identifier (ID), the method further comprising verifying through an out-of-band communication that the instance ID is associated with a valid server instance.

16. The method of claim 14, wherein the out-of-band location comprises console output of the server instance.

17. The method of claim 14, wherein the security token comprises an instance identifier (ID) associated with the server instance.

18. The method of claim 14, wherein the security token comprises a network address associated with the server instance.

19. The method of claim 14, wherein the security token comprises a public cryptographic key corresponding to a private cryptographic key generated by the server instance.

20. The method of claim 14, wherein the security token identifies a public cryptographic key corresponding to a private cryptographic key generated by the server instance.

* * * * *